June 3, 1958 J. D. RICHARD, JR 2,837,636

RADIO TEST SIGNAL GENERATION

Filed March 8, 1954

INVENTOR

Joseph D. Richard Jr.

2,837,636
Patented June 3, 1958

2,837,636

RADIO TEST SIGNAL GENERATION

Joseph D. Richard, Jr., South Miami, Fla.

Application March 8, 1954, Serial No. 414,811
2 Claims. (Cl. 250—20)

This application for patent is filed as a continuation-in-part of the pending application filed January 28, 1953, for Radio Test Signal Generation, Serial No. 333,630 by Joseph D. Richard, Jr. The earlier application filed for Letters Patent for Radio Test Signal Generation, Serial No. 333,630 has been abandoned without prejudice to the present application.

The present invention relates to the field of radio communications. More particularly, the present invention is directed to a method and apparatus wherein the over-all performance of a communications receiver may be quantitatively checked without the use of external test equipment.

In the past, two well-known methods have been employed for checking the over-all performance of a communications receiver. The simplest method involves tuning the receiver on a transmitted signal and noting qualitatively the characteristics of the received audio. In another method, a modulated R. F. signal generator is connected to the receiver input and a meter is connected to the audio output. The receiver gain can be quantitatively determined using such a method. Both of the above described methods require the use of external equipment for evaluating the over-all performance of a radio receiver. The method of tuning on a transmitted signal has the advantage of simplicity and can be done by an untrained person. The evaluation of the receiver performance is only qualitative, however, and the method cannot be used when appropriate radio signals are not being transmitted, such as when radio silence is being observed. A trained person is required for evaluating receiver performance with a signal generator and meter. Often such a person is unavailable or else the appropriate test equipment is unavailable.

It is the principal object of my invention to provide a method and apparatus whereby the over-all performance of a communications receiver may be evaluated without the use of external test equipment.

A further object of my invention is to provide a method and apparatus whereby a person unskilled in radio maintenance can evaluate the performance of a communications receiver.

Other objects and advantages will become more apparent from a study of the following specifications and drawings.

Briefly the present invention involves the use of the radio frequency amplifier stage of a communications receiver as a signal generator. The input stage of a receiver is a tuned amplifier circuit. Most radio frequency oscillators are essentially tuned amplifier circuits with means provided whereby a portion of the output signal is fed back into the amplifier input. The R. F. amplifying stage of a receiver is provided with a feedback system whereby sustained oscillations occur. The frequency of oscillation is very close to the resonant frequency of the tuned input. The oscillation of the receiver input stage simulates the reception of a radio frequency signal by the receiver. Means are provided for modulating these selfsustained R. F. oscillations at some audio frequency. Means are also provided for observing the resulting audio signal from the receiver output.

Several embodiments of the present invention will be described in detail with the accompanying drawing in which Figure 1 shows in block diagram a communications receiver adapted according to my invention.

Figure 4:
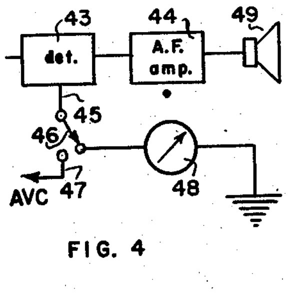

Figure 4 shows in block diagram the measurement of the A. V. C. voltage as a method of evaluating the receiver output.

Figure 5:
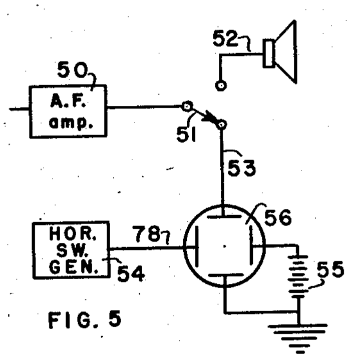

Figure 5 shows in block diagram a C. R. T. used for indicating the audio output of the communications receiver.

Figure 6:
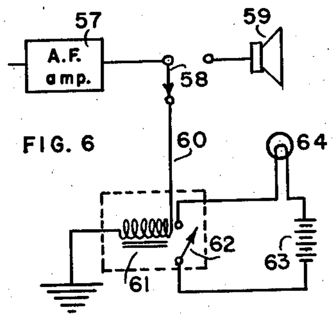

Figure 6 shows a relay used as an audio frequency amplitude discriminating device at the output of the communications receiver.

Figure 7:
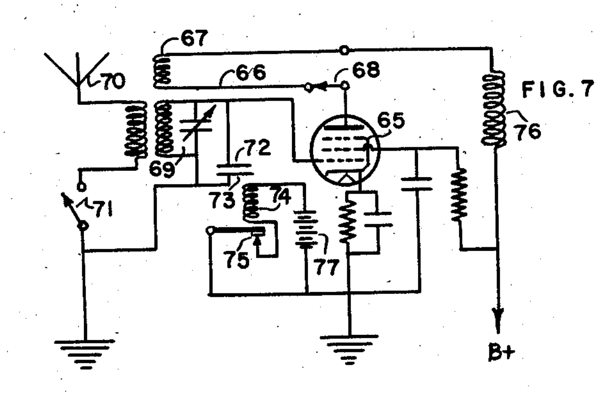

Figure 7 shows schematically the input stage of a frequency modulation receiver with feedback means provided and a means for frequency modulating the sustained oscillations at some audio frequency.

Figure 1:
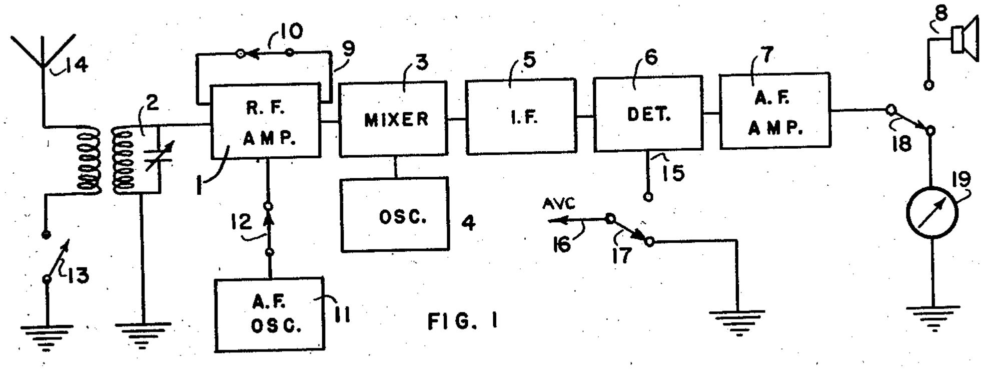

Referring more specifically to Fig. 1, the numeral 1 denotes the R. F. amplifier of a conventional superheterodyne radio receiver which includes also a mixer stage 3, a local oscillator 4, an I. F. amplifier 5, a detector stage 6, and an audio frequency amplifying stage 7. Also shown as representing parts of a conventional receiver are the tuned input tank circuit 2, the antenna 14, and the speaker 8. The A. V. C. voltage lead from the detector is represented by 15 and the numeral 16 represents the circuit through which the A. V. C. voltage is fed to the high frequency amplifier stages.

The receiver as shown in block diagram in Fig. 1 has been adapted according to my invention by the addition of a feedback network 9 by means of the switch 10 into the radio frequency amplifier stage 1. The switch 13 opens the antenna. The switch 12 connects a source of audio frequency oscillations 11 to the R. F. amplifier 1 in such a manner that the oscillations of the R. F. amplifier 1 are modulated by the audio frequency of the A. F. oscillator 11. The switch 17 connects the A. V. C. feed system 16 to ground. The switch 18 disconnects the audio frequency amplifying stage 7 from the speaker 8 and connects it to the A. C. voltmeter 19.

Figure 2:
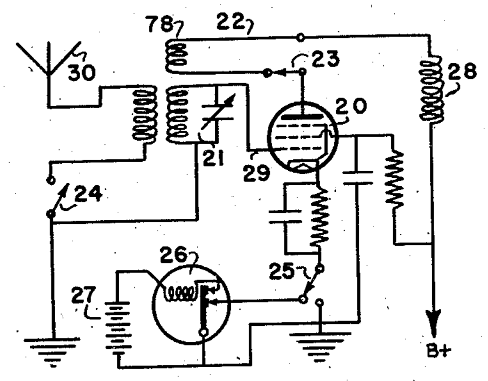
Figure 2 shows a mutual inductance feedback loop providing the required feedback and a chopper providing the modulation.

Figure 2 shows in some detail a R. F. amplifying stage adapted according to my invention. The R. F. amplifier 20 is provided with a mutual inductance feedback loop 22, 78 by means of the switch 23. The switch 24 disconnects the antenna. The switch 25 disconnects the bottom of the cathode resistor from ground and connects it through the contacts of the vibrator or chopper 26. The chopper 26 is vibrated by means of the voltage source 27. The chopper 26 thus provides an intermittent connection to ground for the bottom of the cathode resistor.

Figure 3:
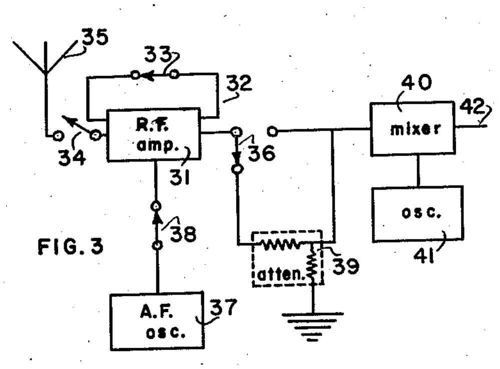
Figure 3 shows in block diagram the addition of an attenuator between the R. F. amplifier and the mixer stage.

Figure 3 shows in block diagram the R. F. amplifier 31 of a radio receiver. A feedback loop 32 is inserted into the R. F. amplifier 31 by means of the switch 33. The switch 34 disconnects the antenna 35. The switch 38 connects a modulating audio frequency to the R. F. amplifier 31 from the audio frequency oscillator 37. The switch 36 connects the attenuator circuit 39 between the R. F. amplifier 31 and the mixer stage 40. Also shown is the local oscillator 41 and the lead 42 which connects to the I. F. amplifier stages.

Figure 4 shows in block diagram the detector stage 43 of a radio receiver. Also shown are an A. F. amplifier stage 44 and a speaker 49. The switch 46 disconnects the A. V. C. voltage 45 from the A. V. C. feed system represented by 47 and connects the A. V. C. voltage 45 to a D. C. meter 48.

Figure 5 shows in block diagram the audio frequency amplifier 50 of a radio receiver. The switch 51 disconnects the A. F. amplifier 50 from the speaker 52 and connects it to the vertical deflection circuit of the C. R. T. 56. The horizontal sweep generator 54 provides the horizontal deflection for the C. R. T. 56.

Figure 6 shows in block diagram the audio frequency amplifier 57 of a radio receiver. The switch 58 disconnects the A. F. amplifier from the speaker 59 and connects it to the lead 60 of the relay coil 61. Shown in series are a voltage source 63, a lamp 64, and the normally open relay contacts 62.

Figure 7 shows schematically the input stage of a frequency modulation receiver including the amplifier 65. The switch 68 inserts the mutual inductance feedback loop 66, 67 into the circuit. The switch 71 disconnects the antenna 70. A small capacitance consisting of the fixed plate 72 and the flexible plate 73 is connected in parallel with the tuned tank circuit 69. Shown connected in series are a voltage source 77, the coil of a vibrator or chopper 74 and the intermittent contacts 75. The flexible plate 73 is arranged so that it is vibrated at the characteristic frequency of the chopper 74, 75.

Returning now to Figure 1, the method of obtaining the test signal generation will be described in more detail. When the receiver performance is to be checked the feedback network 9 is switched into the R. F. amplifier 1. The feedback is of the proper amount and phase to cause sustained oscillation at the tuned frequency. Since the R. F. amplifier is oscillating at its tuned frequency, the reception of a radio signal of that same frequency is simulated. The switch 13 disconnects the antenna. The audio frequency oscillator 11 is used to modulate the oscillations of the R. F. amplifier at some audio frequency. The modulator is connected by means of switch 12. Many methods by which the high frequency oscillation of 1 can be modulated by the audio frequency of 11 are well known in the art so they are here represented by a block diagram. The switch 17 disconnects the A. V. C. circuits 16 from the A. V. C. voltage 15 and grounds the A. V. C. circuits. The switch 18 connects the audio output to an A. C. voltmeter 19 so that the audio output may be measured.

In Figure 2, a mutual inductance feedback loop 22, 78 is switched into the R. F. amplifier circuit of a radio receiver. The mutual inductance between the feedback coil 78 and the inductance of the tuned tank circuit 21 is sufficient to cause sustained oscillations when the switch 23 inserts the feedback loop 22, 78 into the plate circuit of the amplifier 20. At the same time the switch 23 is closed, the switch 24 is opened and the antenna disconnected. The switch 25 connects the bottom of the cathode resistor through the intermittent contacts of the vibrator or chopper 26. This interrupts the oscillations of the amplifier 20 at the vibration frequency of the vibrator 26. The intermittent interruption of the oscillations effectively modulates the oscillating amplifier 20 one hundred percent. If, for example, the vibrator frequency is 400 C. P. S., the R. F. oscillations will be modulated one hundred percent at 400 C. P. S.

In Figure 3, the antenna 35 is disconnected by means of the switch 34, the feedback loop 32 is switched in by means of the switch 33, the source of audio frequency 37 is connected by means of the switch 38 and the switch 33, the source of audio frequency 37 is connected by means of the switch 38 and the switch 36 connects in the attenuator circuit 39. The oscillations of the amplifier 20 may be of greater amplitude than the usual radio frequency signal received by the R. F. amplifier. The attenuator 39 is switched between the R. F. amplifier 31 and the mixer 40 at the same time that the feedback loop 32 is inserted. The attenuator 39 is set to reduce the amplitude of the oscillations so that a signal of approximately normal level is coupled to the mixer stage 40. The oscillations of the R. F. amplifier 31 are modulated by the audio frequency of the oscillator 37.

In Figure 4, the switch 46 disconnects the A. V. C. voltage lead 45 from the A. V. C. feed circuit 47 and connects the A. V. C. voltage to the D. C. voltmeter 48. The level of the A. V. C. voltage is used as an evaluation of the receiver performance when the R. F. amplifier is caused to oscillate at its tuned frequency and modulated with an audio frequency. Assuming that the over-all system has previously been calibrated, the receiver sensitivity can be estimated from the level of the A. V. C. voltage developed.

In Figure 5 the audio output is connected to the vertical deflection circuit of the C. R. T. and a horizontal sweep generator provides the horizontal deflection.

In Figure 6 the A. C. voltage relay coil 61 closes the contacts 62 when an audio signal of a certain previously established level is received. When the contact 62 is closed the light 64 is operated by the voltage source 63. Thus the light 64 is used to indicated acceptable receiver performance when the over-all system has been previously calibrated and the various levels set.

In Figure 7, the R. F. amplifier 65 of a frequency modulation receiver is caused to oscillate at its tuned frequency as was previously described. The oscillations are frequency modulated by varying the resonant frequency above and below the center frequency, the frequency keeping within the band width of the receiver I. F. stages and the rate of frequency alternation being at some audio frequency. This is accomplished by adding into the tank circuit 69 of the tuned input, a small capacitance having one fixed plate 72 and one flexible plate 73 and means for vibrating the flexible plate at some audio frequency. In the regular operation of the receiver, the small capacitor 72, 73 would serve merely as a fixed capacitance in parallel with the main capacitance of the tuned circuit 69. When the receiver performance is to be evaluated the feedback loop is inserted as previously described, the antenna disconnected, and the flexible plate 73 of the small capacitor is vibrated by means of the vibrator coil 74. When the flexible plate 73 of the capacitor is vibrated, its capacitance changes above and below its steady state value, and this causes the resonant frequency of the tuned circuit to vary above and below its center frequency. The capacitance of the small added capacitor should vary above and below its steady state value only enough to swing the resonant frequency within the band width of the receiver I. F. stages. Means must also be provided for indicating the resulting amplified audio signal from the receiver output.

In the above described method of generating a radio test signal a large number of variations are possible in the methods used for achieving the required feedback. The input amplifier stage is temporarily provided with means for exciting the grid and plate in opposite phase, and some form of feedback is needed to furnish a grid voltage derived from the plate circuit output. Since the theory of this generalized type of oscillator is well known in the art, no explanation will be given as to its theory of operation.

Means must be provided for modulating the radio frequency oscillations of the input stage. A source of audio frequency voltage can be provided and the oscillating input amplifier modulated by one of a wide variety of methods. The various methods are well known in the art and will therefore not be discussed in detail. A chopper may also be used to interrupt the R. F. oscillations at some audio frequency.

In the generation of the radio test signal described, the antenna is disconnected temporarily and the A. V. C.

feed circuits are grounded or else set at some fixed bias level for the duration of the receiver test.

A wide variety of means can be used for indicating the audio output of the A. F. amplifier. The simplest indication of a satisfactory over-all performance might be an audible tone from a speaker or earphone. More quantitative indications may be obtained by the use of an A. C. voltmeter. A small C. R. T. built into the radio receiver may also be used to indicate the audio output. The horizontal sweep generator, which provides the horizontal deflection, may be synchronized with or triggered by the same audio frequency voltage which modulates the R. F. amplifier oscillations.

A discriminating device, such as a suitable relay, may be used which will be actuated upon the reception of a previously established satisfactory audio-output. The relay can be used to turn on an indicating light to indicate satisfactory receiver performance.

The A. V. C. voltage developed in the detector stage also may be used to indicate the audio output level. The A. V. C. voltage could be indicated directly by means of a D. C. voltmeter or else the A. V. C. voltage could be used to operate a sensitive relay when an acceptably high A. V. C. voltage is developed. The relay could control a suitable indicating device.

The oscillations of the R. F. amplifying stage may be of much higher amplitude than any R. F. signal received in actual operation. For this reason an attenuator may be temporarily switched in between the R. F. amplifier and the mixer stage during the test. In another method a fixed negative bias may be temporarily connected to the A. V. C. feed circuits for the duration of the receiver test.

When some forms of feedback are used to cause the input amplifying stage to oscillate at its tuned frequency, a slight frequency shift occurs when the feedback loop is switched into the circuit. Such a frequency shift may occur, for example, when a mutual inductance feedback loop is switched in. This frequency shift may require compensation in a receiver which has highly selective I. F. amplifier stages. This compensation consists of means for temporarily causing the local oscillator to shift frequency a corresponding amount for the duration of the test. For example, if when the feedback loop is switched in the resonant frequency of the tuned input circuit is shifted to a slightly lower frequency, the shift will be constant for a fixed feedback arrangement and the local oscillator frequency can be temporarily shifted a corresponding amount by switching in a small additional capacitance into its tuned circuit. In this manner the difference frequency can be made to correspond to the I. F. frequency for the duration of the receiver test.

It will be seen that I have provided a means for evaluating the performance of a communications receiver which does not require the use of external test equipment or the services of a skilled maintenance person. It should be understood that the various components described may be readily built into a radio receiver and that no substantial increase in weight or cost would be required.

It will be apparent that modifications will be readily suggested to those skilled in the art as the result of the teaching of my invention; hence, it should be understood that my invention is not limited by the specific construction hereinbefore described, which is merely an exemplary embodiment, and should be restricted only insofar as set forth in the following claims.

What is claimed is:

1. A method of checking the overall performance of a communications receiver which has a feedback loop switchable into its radio frequency amplifying stage, which comprises: causing the tuned radio frequency amplifying stage of the communications receiver to oscillate substantially at its tuned frequency, said oscillations thereby simulating a received radio frequency signal; modulating said oscillations at some lower frequency, said modulated oscillations thereby simulating a received modulated radio frequency signal; and indicating, quantitatively, the amplitude of signals of the said lower frequency from the output stage of the said communications receiver, said indication thereby being a measure of the overall performance of the said communications receiver.

2. In combination with a radio receiver having a tuned radio frequency input stage and an audio frequency output stage, along with the various intermediate stages including a detector stage with automatic volume control circuits: switching means for disabling the antenna of said radio receiver; means for inserting a feedback loop from the output circuit of the said radio frequency input stage to the input circuit of the same stage, said feedback loop being capable of causing sustained oscillations at substantially the tuned frequency of the said radio frequency stage; an audio frequency voltage source within said radio receiver; means for modulating the said radio frequency input stage with the said audio frequency voltage; means for disabling the operation of the automatic volume control circuit of the said radio receiver; and means for quantitatively indicating the amplitude of the audio frequency signals from the audio output stage of the said radio receiver.

References Cited in the file of this patent

UNITED STATES PATENTS

| | | |
|---|---|---|
| 2,106,159 | Runge | Jan. 25, 1938 |
| 2,213,398 | Kircher | Sept. 3, 1940 |
| 2,366,329 | George | Jan. 2, 1945 |
| 2,393,856 | Collins | Jan. 29, 1946 |
| 2,409,845 | Gardiner | Oct. 22, 1946 |
| 2,491,244 | Becker | Dec. 13, 1949 |
| 2,546,248 | Wynn | Mar. 27, 1951 |
| 2,678,383 | Frantz | May 11, 1954 |

FOREIGN PATENTS

| | | |
|---|---|---|
| 467,754 | Great Britain | June 23, 1937 |